(12) United States Patent
Sung

(10) Patent No.: US 10,247,857 B2
(45) Date of Patent: Apr. 2, 2019

(54) MANUFACTURING METHOD OF ANTI-FOG COATINGS ON LENSES

(71) Applicant: Hsiu-Ying Sung, Taipei (TW)

(72) Inventor: Hsiu-Ying Sung, Taipei (TW)

(*) Notice: Subject to any disclaimer, the term of this patent is extended or adjusted under 35 U.S.C. 154(b) by 0 days.

(21) Appl. No.: 15/423,758

(22) Filed: Feb. 3, 2017

(65) Prior Publication Data

US 2017/0242159 A1 Aug. 24, 2017

(30) Foreign Application Priority Data

Feb. 5, 2016 (TW) .............................. 105104049 A

(51) Int. Cl.
| | |
|---|---|
| *G02B 1/18* | (2015.01) |
| *B05D 1/02* | (2006.01) |
| *B05D 3/06* | (2006.01) |
| *B05D 3/00* | (2006.01) |
| *B05D 7/02* | (2006.01) |
| *G02B 1/12* | (2006.01) |
| *C09D 5/00* | (2006.01) |

(52) U.S. Cl.
CPC ................ *G02B 1/18* (2015.01); *B05D 1/02* (2013.01); *B05D 3/002* (2013.01); *B05D 3/067* (2013.01); *B05D 7/02* (2013.01); *C09D 5/00* (2013.01); *G02B 1/12* (2013.01)

(58) Field of Classification Search
CPC . B05D 1/02; B05D 3/061; G02B 1/14; G02B 1/18; G02B 1/10
USPC ............................ 118/300–326; 427/162–169
See application file for complete search history.

(56) References Cited

U.S. PATENT DOCUMENTS

| | | | | |
|---|---|---|---|---|
| 4,385,083 A | * | 5/1983 | Shelley ..................... | B05C 9/08 118/50 |
| 5,244,935 A | * | 9/1993 | Oshibe ..................... | C03C 17/32 522/121 |
| 6,277,485 B1 | * | 8/2001 | Invie ........................ | C09D 4/00 106/287.13 |
| 6,634,879 B2 | * | 10/2003 | Buazza ............ | B29D 11/00442 118/320 |
| 2002/0041929 A1 | * | 4/2002 | Magne ................ | B05B 13/0228 427/240 |
| 2006/0284326 A1 | * | 12/2006 | Weymouth, Jr. ............................ | B29D 11/00865 264/1.32 |
| 2009/0029061 A1 | * | 1/2009 | Shinde ................ | B05B 13/0228 427/508 |

(Continued)

*Primary Examiner* — Elizabeth A Burkhart
(74) *Attorney, Agent, or Firm* — Li & Cai Intellectual Property (USA) Office

(57) ABSTRACT

A manufacturing method of anti-fog coatings on lenses is provided. The method includes: a lens assembling step, a lens spraying step, a pre-drying step, a curing step and a lens obtaining step. In the lens assembling step, a plurality of lenses are disposed on a base of a movable carrier. In the lens spraying step, the plurality of lenses are moved to a spraying device and sprayed with a light-curable anti-fog material on a surface thereof. In the pre-drying step, any extra light-curable anti-fog materials are removed from the plurality of lenses by a suction device. In the curing step, the plurality of lenses are placed into a light curing apparatus and radiated by the ultraviolet lights to form an anti-fog coating on the surface of the plurality of lenses. In the lens obtaining step, the plurality of lenses are taken out of the light curing apparatus.

9 Claims, 6 Drawing Sheets

(56) References Cited

U.S. PATENT DOCUMENTS

2011/0250442 A1* 10/2011 Castro .................. B82Y 10/00
428/336

* cited by examiner

MANUFACTURING METHOD OF ANTI-FOG COATINGS ON LENSES

BACKGROUND

1. Technical Field

The present disclosure is related to a manufacturing method of anti-fog coatings on lenses, and in particular, to a manufacturing method of anti-fog coatings on lenses made of plastic materials for swimming and/or sport goggles.

2. Description of Related Art

Situations where temperature changes rapidly can cause optical lenses to suddenly "fog up" and block vision. Since swimming or sport goggles are often exposed to the foregoing situation, anti-fog treatments are usually performed therefor.

Conventional anti-fog treatments for optical grade lenses involve spraying a thermal curing material on lenses, then heating and drying the thermal curing material on the lenses to form an anti-fog coating. Current manufacturing processes of anti-fog coatings for lenses usually includes the following steps: firstly, hanging the lenses on a rail hanger or a conveyor belt after cleaning surfaces of the lenses; then, removing dust from the surfaces of the lenses; afterwards, conveying lenses to an isolation chamber and spraying anti-fog materials on the lenses from nozzles; removing the extra anti-fog materials shedding from the surfaces of the lenses by suction nozzles; after that, preliminarily drying the anti-fog materials on the surfaces of lenses, and then, moving the lenses to an oven or a furnace for thermal curing, which cures the anti-fog materials on the lenses.

In conventional manufacturing processes of anti-fog coatings for lenses, the way the lenses are hung may cause shaking of the lenses and failure to precisely position the lenses during the spraying process even through automatic robotic arms. In order to make lenses steady, the lenses need to be positioned by human hands during the spraying treatment, which increases manual labor and affects the quality of products due to the uneven coating.

In addition, during the curing process, the sprayed and dried lenses are set on a conveyor belt by hands and conveyed through a tunnel furnace by the conveyor belt to conduct the curing steps for the anti-fog coating. However, since the curing process for the thermal curing material often takes a long time (usually up to 30 minutes), a thermal furnace with a long enough length is required, and lenses are required to be conveyed at a slow speed on the conveyor belt so as to prolong the heating time for the lenses in the furnace for full completion of the curing process of the anti-fog coating. Therefore, the conventional apparatus used for manufacturing the anti-fog coating on lenses not only occupies large space in a factory, but also has a low productivity.

In addition, since the length of the tunnel furnace used by the conventional manufacturing method is too long, working stations for each process of the manufacturing method must be arranged serially and in a long line, which not only occupies large spaces in the factory, but also requires a great amount of human resource due to the long distance between each working station, thereby increasing the manufacturing costs.

Therefore, there is a need in the art for a manufacturing method that overcomes the above disadvantages.

SUMMARY

The object of the present disclosure is to provide a manufacturing method of anti-fog coatings on lenses to improve the conventional manufacturing processes in which the carrier of lenses fails to be positioned in place, which causes inconveniences when applied to automatic spraying processes. In addition, operation of the heating/curing apparatus having such large size inevitably increases the production costs of the conventional manufacturing processes.

Accordingly, a manufacturing method of anti-fog coatings on lenses includes the following steps. A lens spraying step: moving a plurality of lenses to a spraying device, and spraying a light-curable anti-fog material on a surface of the plurality of lenses. A cleaning step: removing the extra the light-curable anti-fog material from the plurality of lenses sprayed with the light-curable anti-fog material by a suction nozzle of a suction device. A pre-drying step: setting the plurality of lenses sprayed with the light-curable anti-fog material for a predetermined time so as to preliminarily dry the light-curable anti-fog material. A curing step: placing the plurality of lenses dried by the pre-drying step into a light curing apparatus, and radiating the plurality of lenses with ultraviolet lights, such that the light-curable anti-fog material absorbs the ultraviolet lights to cure and form an anti-fog coating on the surface of the plurality of lenses. A lens obtaining step: taking the plurality of lenses out of the light curing apparatus.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
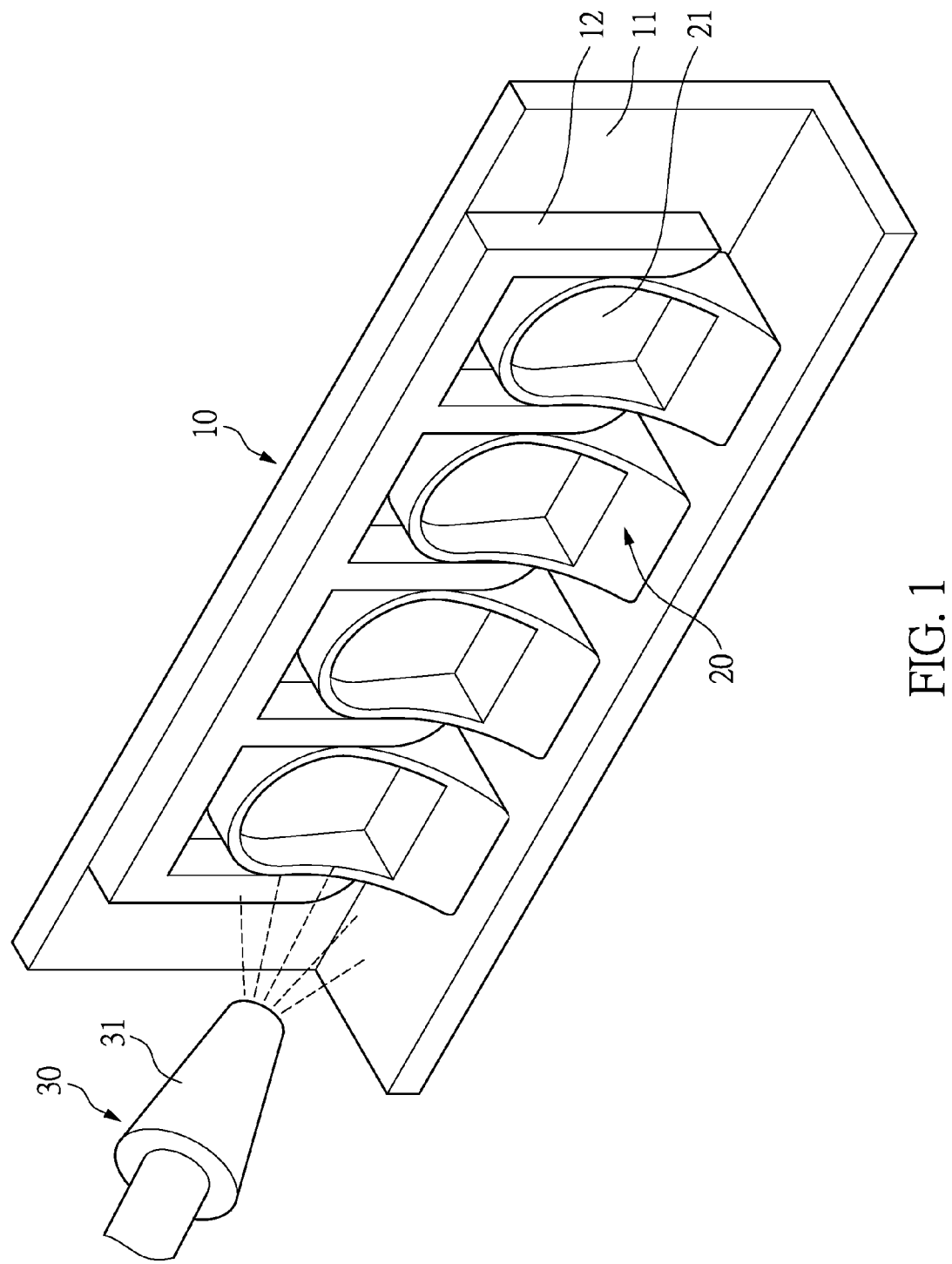
FIG. 1 is a dimensional view of the lens spraying step using a movable carrier to carry a plurality of lenses according to the present disclosure.
Figure 2:
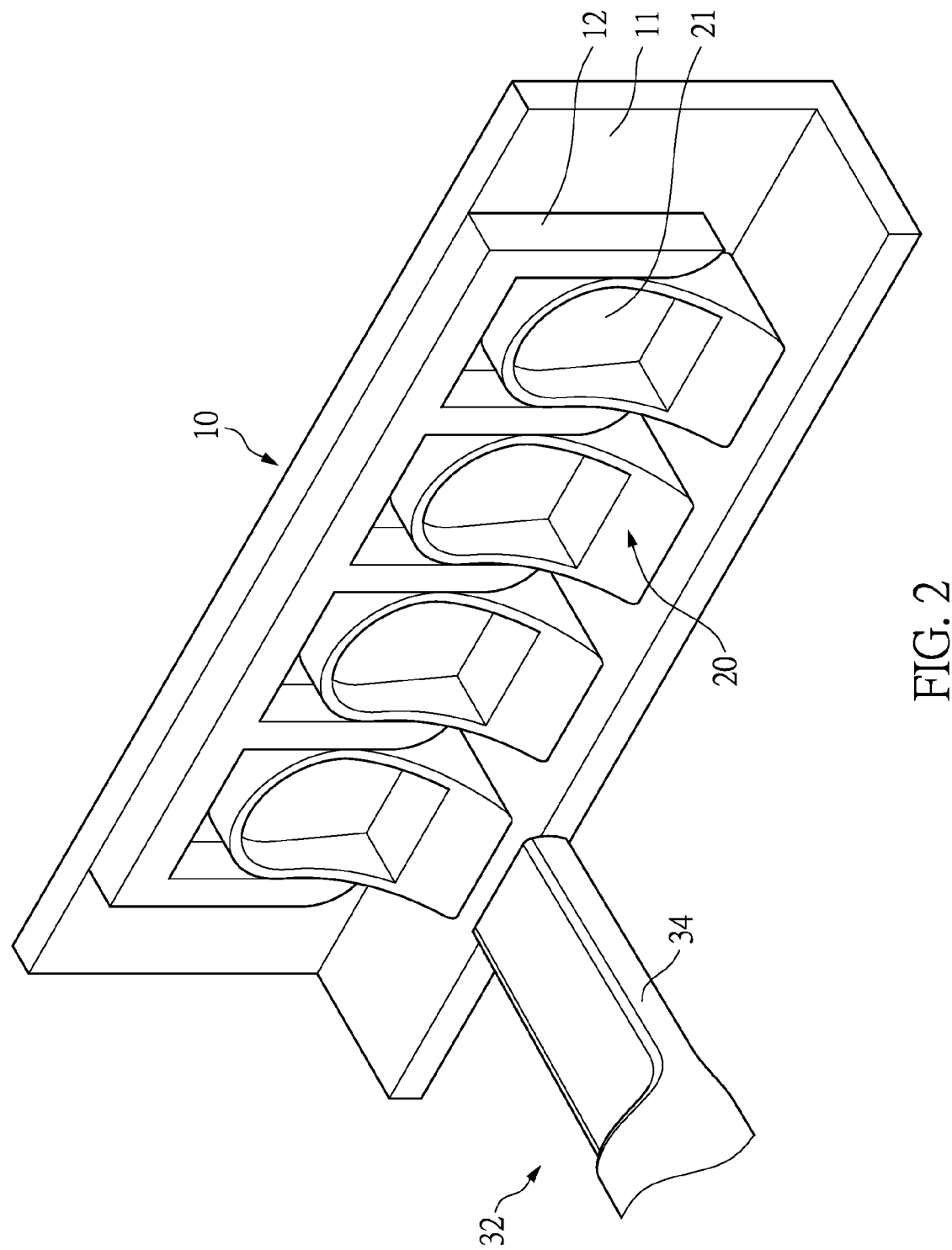
FIG. 2 is a dimensional view during of cleaning step for the plurality of lenses by a suction nozzle of a suction device according to the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Referring to FIG. 1 to FIG. 5, the manufacturing method of anti-fog coating on the lenses according to the present disclosure improves on the conventional technique by utilizing an ultraviolet light curing technology and an anti-fog coating manufacturing unit 60 in a modular production mode, so as to reduce occupation spaces and to increase production efficiency and quality.

Figure 4:
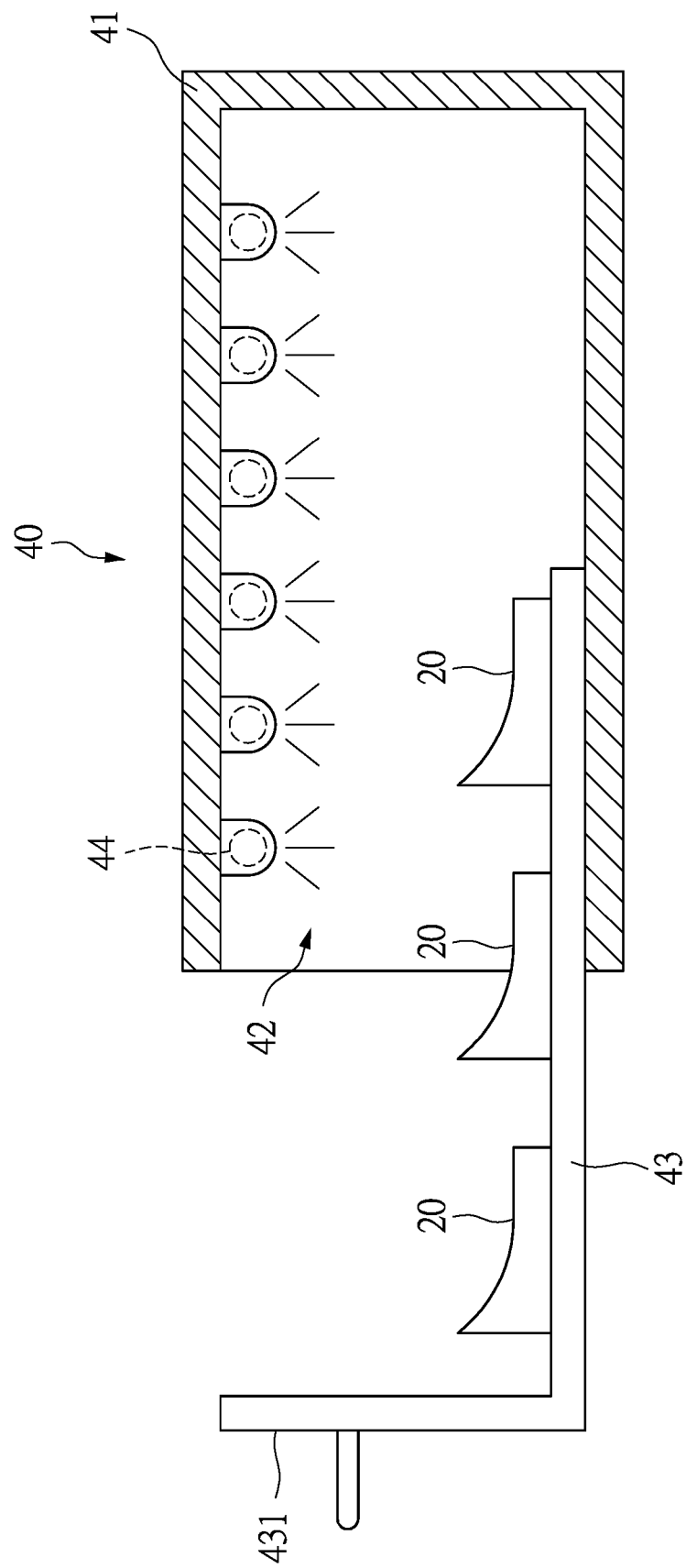
FIG. 4 is a sectional view of the light curing apparatus according to the first embodiment of the present disclosure.
Figure 5:
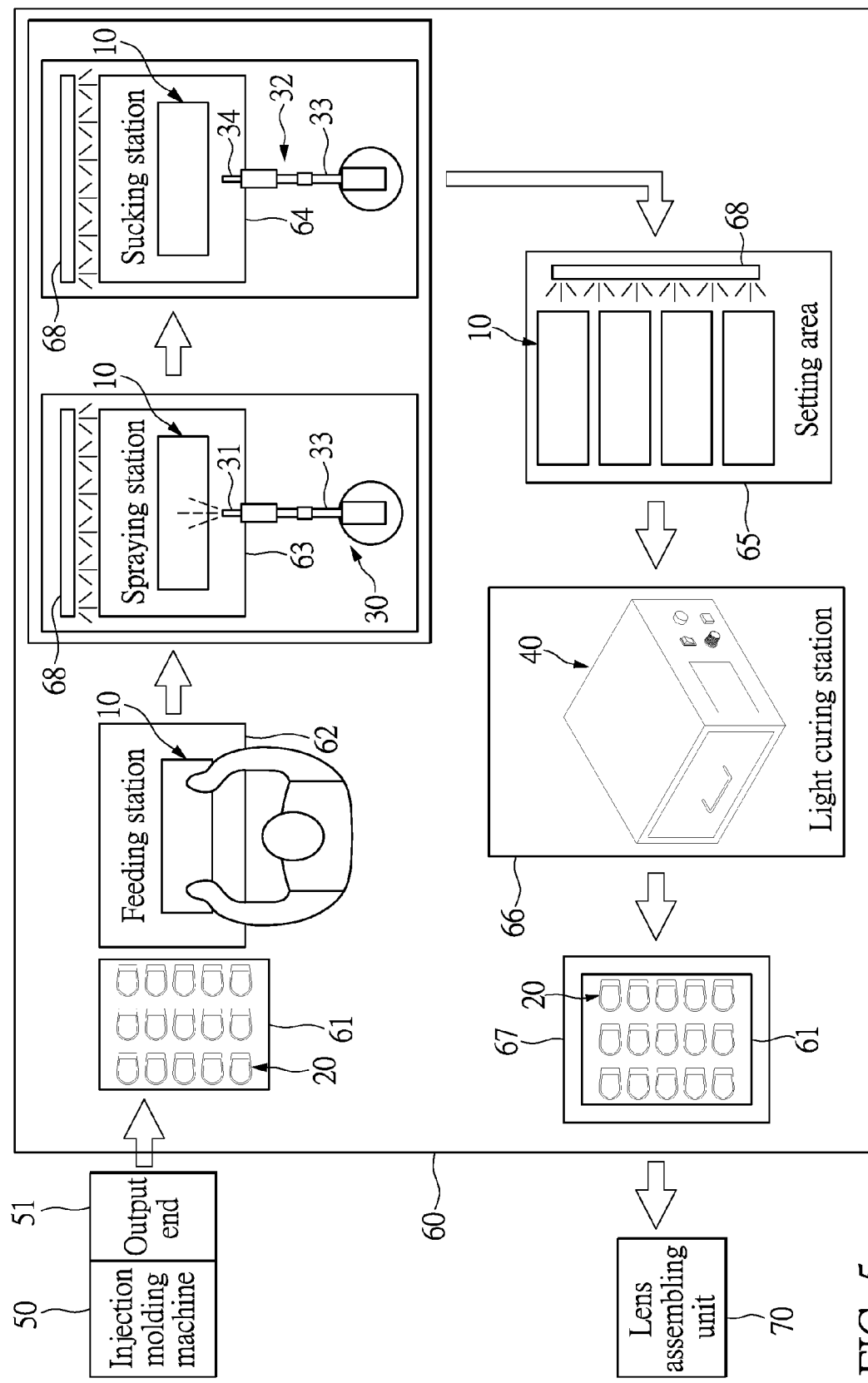
FIG. 5 is a flow diagram showing a manufacturing method of anti-fog coatings on lenses using an anti-fog coating manufacturing unit according to the present disclosure.
Figure 6:
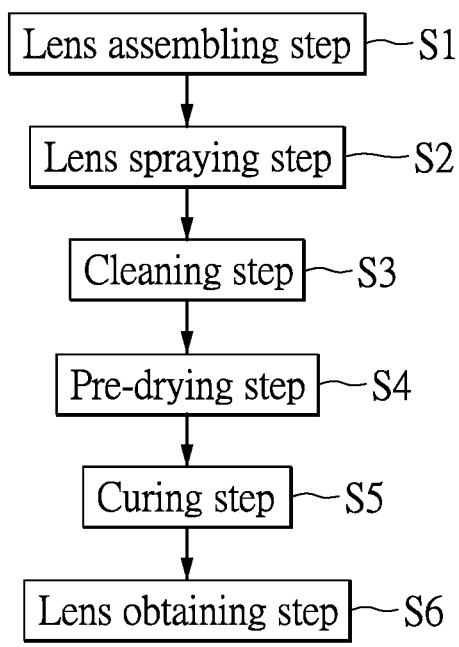
FIG. 6 is a flow diagram showing the manufacturing method of anti-fog coatings on lenses according to the present disclosure.

Referring FIG. 5 and FIG. 6, the manufacturing method of anti-fog coatings on the lenses according to the present disclosure is used for forming anti-fog coating on a lens molded by plastic injection molding. The method according to the present disclosure includes: a lens assembling step S1, a lens spraying step S2, a cleaning step S3, a pre-drying step S4, a curing step S5 and a lens obtaining step S6. As shown in FIG. 4, the lens assembling step S1, the lens spraying step S2, the cleaning step S3, the pre-drying step S4, the curing step S5 and the lens obtaining step S6 are respectively performed in a feeding station 62, a spraying station 63, a sucking station 64, a setting area 65, a light curing station 66 and a discharging station 67 in order.

As shown in FIG. 1, in the lens assembling step S1 of the present disclosure, a plurality of lenses 20 produced by the injection molding machine and passing the quality test are disposed on a movable carrier 10. The movable carrier 10 includes a base 11 and a plurality of fixtures 12 disposed on the base. Each of the plurality of fixtures 12 is disposed on one side of the movable carrier 11 and holds individually a lens 20 on the base 11 of the movable carrier 10 with a surface 21 of the lens 20 facing outward, such that the plurality of lenses 20 are steadily fixed on the base 11 during disposition of the plurality of lenses 20 on the movable carrier 10.

It should be noted that various types of movable carriers, such as a conveyor belt and a lens hanging shelf, can be applied in the manufacturing method and is not limited to that disclosed in the present disclosure.

According to the manufacturing method of the present disclosure, the movable carrier 10 is used as carriers for carrying the plurality of lenses 20. There are a predetermined number of the fixtures 12 on each movable carrier 10 for carrying a corresponding number of the lenses 20. Therefore, the lenses 20 can be transported by the movable carrier 10 to each manufacturing station to undergo each manufacturing process. The movable carrier 10 can be moved manually or with a conveyor belt, but the present embodiment is not limited thereto.

After the plurality of lenses 20 are carried on the movable carrier 10, the movable carrier 10 and the plurality of lenses 20 are moved to the spraying station 63 for performing the lens spraying step S2. Since the movable carrier 10 can carry a plurality of the lenses 20 at the same time for each step in the manufacturing process, the number of the lenses 20 processed in each process can be increased, so that productivity is increased, and the cost and time for manufacturing each of the lens 20 is decreased.

The spraying station is a separated space and has a spraying device 30, as shown in FIG. 1 and FIG. 5. According to the present disclosure, the spraying device 30 includes a nozzle 31 controlled by an automatic mechanical arm 33. A light-curable anti-fog material is sprayed onto the surfaces 21 of the plurality of lenses 20 fixed on the movable carrier 10 through the nozzle 31.

After the spraying, the plurality of lenses 20 are moved to the sucking station 64 to undergo the cleaning step S3. The sucking station 64 includes a suction device 32 which has another mechanical arm 33 and a suction nozzle 34. The light-curable anti-fog material flows down along the surface of the lenses 20 and is sucked through the suction nozzle 34 controlled by the mechanical arm 33. This is to prevent uneven coating on the plurality of lenses 20 due to the remaining anti-fog material, and in addition, to recycle it.

In the lens spraying step S2 and the cleaning step S3 according to the present disclosure, the plurality of lenses 20 are fixed by the plurality of fixtures 12 of the movable carrier 10, hence the plurality of lenses 20 can be held steadily without any help from human hands.

The anti-fog material in the present disclosure is a light-curable anti-fog material. The composition of the light-curable anti-fog material includes: 40 wt % to 50 wt % light-curable resins, 40 wt % to 50 wt % solvents, 3 wt % to 10 wt % photoinitiators, and 0.5 wt % to 1 wt % anti-fog particle type materials.

More specifically, the light-curable resin can be any suitable resin known by those skilled in the art, such as polyurethane acrylic resin, polyester acrylic resin, and epoxy acrylic resin, and the compositions thereof are not reiterated herein for the sake of brevity.

The solvent (diluent) is used to adjust the viscosity of the composition for the light-curable anti-fog material, and to dissolve or disperse evenly the main coating former (i.e. the anti-fog particle type material in the present disclosure). The solvent can also affect the stability of the paint material while in liquid state. The solvent can be, for example, isopropanol (IPA), dipropylene glycol methyl ether acetate (DPMA), dimethyl sulfoxide (DMSO), propylene glycol monomethyl ether acetate (PGMEA), dimethylethanolamine (DMAE), methyl ethyl ketone (MEK), xylene, dipropylene glycol methyl ether (DPM), cyclohexanone, 2-butoxyethanol (BCS), 2-(2-ethoxyethoxy) ethanol (EC), tri(propylene glycol) methyl ether (TPM), propylene glycol methyl ether (PGME), phthalate esters, trimethylolpropane triacrylate (TMPTA), 1-Methoxy-2-propanol, ethanol, complex esters or acrylic acid.

The photoinitiator can be selected from the following: aromatic diazonium salts, triarylsulfonium salt, diaryliodonium salts, ferrocene arene compounds and sodium hydrogen carbonate.

The main component for achieving the fog resistant effect is the anti-fog particle type material, which can form a hydrophobic layer on the surface 21 of the lenses 20 after being cured as the anti-fog coating, thereby preventing steam condensate on the lenses 20. The anti-fog particle type material is preferably nanoscale particles, and can be selected from the group consisting of $SiO_2$, $Al_2O_3$, $TiO_2$, ZnO, or any combination thereof. However, the ratio of each component in the combinations may be varied according to practical needs, and is not limited in the present disclosure.

The light curable anti-fog material according to the present disclosure can be cured more rapidly and with lower energy consumption, as compared with the conventional thermal curing materials. Meanwhile, since less amount of solvent is used in the light curable material than in the thermal curing material, the time required for the pre-drying step can be reduced and the pollution can be minimized.

After the lens spraying step S2 and the cleaning step S3 are completed, the plurality of lenses 20 are moved to a setting area 65 to undergo the pre-drying step S4 in which the plurality of lenses 20 sprayed with the light-curable anti-fog material are set for a predetermined period of time so as to preliminarily dry the light-curable anti-fog material on the surface 21 thereof. Since the ratio of the solvent is reduced in the light curable anti-fog material of the present disclosure, the plurality of lenses 20 can be air-dried under ambient environment in the pre-drying step. Referring to FIG. 5, the setting area 65 provides spaces for the plurality of lenses 20. In order to maintain the stability of the pre-drying effect for the lenses, the temperature of the setting area 65 is kept within the range between 20° C. to 30° C., and the relative humidity is kept within the range between 40% to 60%. Therefore, the lenses 20 can undergo the pre-drying step under constant temperature and humidity.

In the pre-drying step S4, the predetermined time for setting the plurality of lenses 20 can be varied along with types of the solvent (diluent), ambient temperatures and humidity. Generally, the predetermined time is about 3 to 30 minutes, and preferably 5 to 15 minutes. Since the pre-drying step S4 is the most time-consuming step in the method, it may become the bottleneck of the production line of the present disclosure. In order to eliminate the bottleneck effect from the pre-drying step S4, a line balancing principle can be applied to the manufacturing processes of the present disclosure. More specifically, the pre-drying step S4 is performed in the setting area 65 which simultaneously accommodates multiple sets of the movable carrier 10 and the plurality of lenses 20, and a "first-in, first-out" principle is adopted to control the movable carrier 10 and the plurality of lenses 20 to enter or leave the setting area 65. By way of the foregoing, the bottleneck of the product line can be alleviated.

According to the present disclosure, the plurality of lenses 20 is coated with the uncured light curable anti-fog material, which is sensitive to UV light and near UV light (such as blue light, purple light, etc.), during the lens spraying step S2, the cleaning step S3 and the pre-drying step S4. In order to avoid uneven solidification of the light curable anti-fog material resulting from rapid activation by extra UV or near UV lights in the ambient light before the curing step, the aforementioned steps of the lens spraying step S2, the cleaning step S3 and the pre-drying step S4 are performed under yellow light. As shown in FIG. 5, in the spraying station 63, the sucking station 64 and the setting area 65, the external light source can be blocked and a yellow light source 68 can be disposed as light sources for each of the work stations. Since the wavelength of yellow light is longer, the UV light and near UV light in the ambient light can be filtered away, so as to prevent the light curable anti-fog material from being affected by the UV or near UV light, and to improve the quality of the anti-fog coating formed after the curing step.

Figure 3:
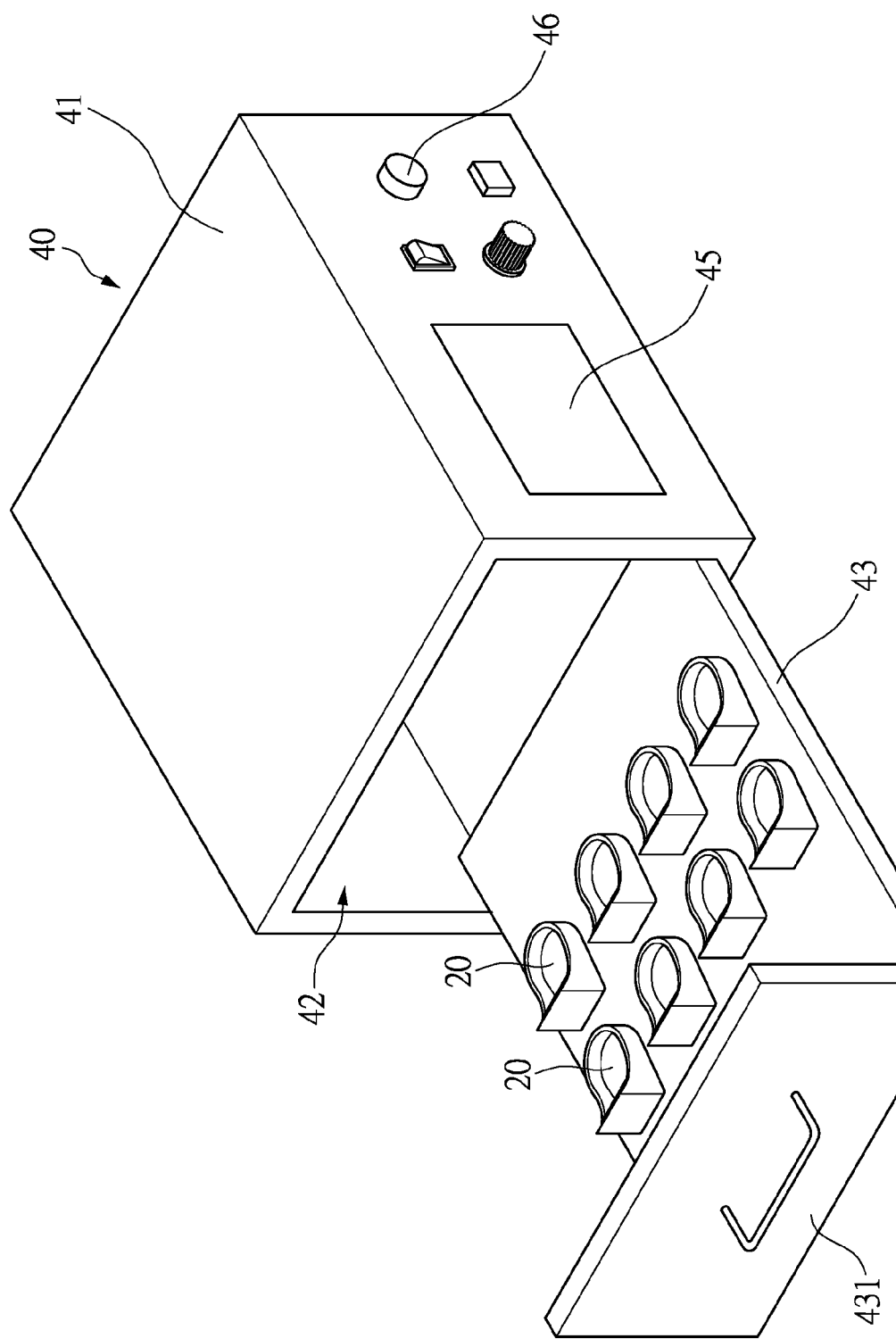
FIG. 3 is a dimensional view of a light curing apparatus according to a first embodiment of the present disclosure.

After the pre-drying step S4 is complete, the dried plurality of lenses 20 and the movable carrier 10 are moved to the light curing station 66 to undergo the curing step S5. Referring to FIG. 3 and FIG. 4, a light curing apparatus 40 is disposed in the light curing station 66 and includes a chamber 41 in which a closed accommodating space is formed and a plurality of UV light sources 44 is disposed, an opening 42 disposed at one side of the chamber 41, and a slidable plate 43.

The slidable plate 43 is slidably disposed in the chamber 41 and is able to slide in or out the accommodating space from the opening 42. As shown in FIG. 4, the slidable plate 43 can be horizontally pushed to a shut position relative to the chamber 41 or pulled out to an open position relative to the chamber 41. In addition, one side of the slidable plate 43 has a covering sheet 431 that can cover the opening 42 of the chamber 41 when the slidable plate 43 is at the shut position relative to the chamber 41.

The plurality of lenses 20 can be placed on the slidable plate 43 after undergoing the lens spraying step S2, the cleaning step S3 and the pre-drying step S4, and then moved in the chamber 41 by the slidable plate 43. Afterwards, each of the plurality of lenses 20 is exposed under the ultraviolet light produced from the UV light source 44 in the chamber 41, such that the light curable anti-fog material sprayed on the plurality of lenses 20 absorbs the ultraviolet light and solidifies to form the anti-fog coating.

The radiation time of the ultraviolet light required for curing the light curable anti-fog material to form the anti-fog coating is quite short, e.g. below 10 seconds, in the curing step S5. In other words, the curing step S4 for a large number of the plurality of lenses 20 can be performed within a short period of time. There is hence no need for the chamber 41 of the light curing apparatus 40 to have a large volume for the curing step S5 according to the present disclosure.

Referring to FIG. 4 and FIG. 5, the light curing apparatus 40 further includes a controlling unit 45, which controls the radiation time of the ultraviolet light radiated by the UV light source 44 to the plurality of lenses 20 and stops the UV light source radiating the ultraviolet light once the anti-fog coating is formed, so as to prevent the anti-fog coating from deterioration.

The controlling unit 45 further has a controlling switch provided for a user to set the radiation time of the ultraviolet light and an operating panel showing a variety of operation information. In addition, the light curing apparatus 40 further includes a display device 46 disposed on the chamber 41 for displaying the variety of information under the variety of operating conditions. For example, an on-state signal can be displayed to indicate that the chamber 41 is under ultraviolet light radiation, and an off-state signal can be displayed or a sound can be emitted to indicate that the curing step S5 for the plurality of lenses 20 is completed. Afterwards, once the curing step S5 is complete, the chamber 41 can be opened, and the plurality of lenses 20 and the movable carrier 10 can be taken out. Then, the next batch of the movable carrier 10 and the plurality of lenses 20 are placed into the chamber 41 to undergo the curing step S5.

Not only does the chamber 41 of the light curing apparatus 40 according to the present disclosure have a small volume which does not occupy much space, but can also perform the curing step for a large number of the lenses 20. Meanwhile, the chamber 41 can block the ultraviolet light produced by the UV light source 44 from the chamber 41 to prevent injury of workers. In addition, the light curing apparatus 40 can precisely control the radiation time and intensity of the ultraviolet light produced by the UV light source 44, such that the light curable anti-fog material on the plurality of lenses 20 can achieve precise radiation intensity of the ultraviolet light, which improves the quality of the anti-fog coating on the plurality of lenses 20.

A lens obtaining step S6 is performed after the curing step S5. The plurality of lenses 20 is taken out from the light curing apparatus 40 and moved to the discharging station 67. Thus completing all steps of the manufacturing method of anti-fog coatings on lenses of the present disclosure.

Each working station for each step of the manufacturing method of anti-fog coatings on lenses according to the present disclosure is arranged separately. Hence, while all the working stations can be arranged in a linear manner (as with the conventional manufacturing process), they can also be arranged in a U shape or in a circle. Referring to FIG. 4, the feeding station 62, the spraying station 63, the sucking station 64, the setting area 65 and the light curing station 66 and the discharging station 67 are arranged adjacently and in order, and more particularly in a U shape or a circle to further cooperatively form the anti-fog coating manufacturing unit 60.

Since the aforementioned working stations in the anti-fog coating manufacturing unit 60 are arranged in a U shape (as shown in FIG. 5) or in a circle, the feeding station 62 and the discharging station 67 are at the same side of the anti-fog coating manufacturing unit 60. That is to say, the input and the output of the anti-fog coating manufacturing unit 60 can be arranged on the same side, thereby constituting a cell production mode of manufacture. Hence, the manufacturing method according to the present disclosure can meet modern production management requirements when applied to diversified and flexible production modes. In addition, since the work stations of in the anti-fog coating manufacturing unit 60 are adjacent to each other, each operator can fully monitor the work of multiple work stations. Last but not the least, the spraying device 30 and the light curing apparatus 40 can be highly automated, such that the number of operators required for every anti-fog coating manufacturing unit 60 can be reduced.

Furthermore, the anti-fog coating manufacturing unit 60 can be further integrated with the injection molding machine 50, which molds the plurality of lenses 20, according to the present disclosure. An output end 51 of the injection molding machine 50 used for molding the plurality of lenses 20 is disposed at an adjacent position to the feeding station 62 of the anti-fog coating manufacturing unit 60. The plurality of lenses 20 can be output from the output end 51 of the injection molding machine 50 to be moved to a lens carrying plate 61. Then, the plurality of lenses 20 standing by for the manufacturing method of anti-fog coatings on lenses are moved to be adjacent to the feeding station 62 to make it easier for operators to place the plurality of lenses 20 from the lens carrying plate 61 to the movable carrier 10.

The end products of the manufacturing method of anti-fog coatings on lenses are taken out from the light curing apparatus 40 to another lens carrying plate 61 of the discharging station 67, and then transported to a lens assembling unit 70 to undergo subsequent lens assembling processes.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A manufacturing method of anti-fog coatings on lenses, wherein the manufacturing method is performed in an anti-fog coating manufacturing unit including a feeding station, a spraying station, a sucking station, a setting area, a light curing station and a discharging station, comprising:
    a lens spraying step, performed at the spraying station: moving a plurality of lenses to a spraying device, and spraying a light-curable anti-fog material on a surface of the plurality of lenses;
    a cleaning step, performed at the sucking station: removing the extra the light-curable anti-fog material from the plurality of lenses sprayed with the light-curable anti-fog material by a suction nozzle of a suction device;
    a pre-drying step, performed at the setting area: setting the plurality of lenses sprayed with the light-curable anti-fog material for a predetermined time so as to preliminarily dry the light-curable anti-fog material;
    a curing step, performed at the light curing station: placing the plurality of lenses dried by the pre-drying step into a light curing apparatus, and radiating the plurality of lenses with ultraviolet lights, such that the light-curable anti-fog material absorbs the ultraviolet lights to cure and form an anti-fog coating on the surface of the plurality of lenses; and
    a lens obtaining step, performed at the discharging station: taking the plurality of lenses out of the light curing apparatus;
    wherein a yellow light source is disposed for the spraying station, the sucking station and the setting area;
    wherein at the feeding station, the plurality of lenses are disposed on a movable carrier including a base and a plurality of fixtures disposed on the base, wherein each of the plurality of fixtures is disposed on the same side of the movable carrier and holds individually a lens on the base of the movable carrier with a surface of the lens facing outward, such that the plurality of lenses are steadily fixed on the base;
    wherein the base has a first flat plate and a second flat plate, the first flat plate has a first edge and a second edge opposite to the first edge, the second edge is connected to and not coplanar with the second flat plate; each of the plurality of fixtures is disposed only on the first flat plate and has a base portion, having a third edge flush with the first edge; and two holder portions, configured to cooperatively hold the lens and extending respectively from two opposite ends of the base portion towards and without contacting the second edge.

2. The manufacturing method of anti-fog coatings on lenses according to claim 1, wherein the spraying device uses a nozzle controlled by a mechanical arm to spray the light-curable anti-fog material on the surface of the plurality of lenses in the lens spraying step.

3. The manufacturing method of anti-fog coatings on lenses according to claim 1, wherein the light curing apparatus used in the curing step includes: a chamber in which the plurality of lenses are placed; at least one UV light source disposed in the chamber, wherein the at least one UV light source produces the ultraviolet light to radiate the plurality of lenses; and a controlling unit for controlling the time that the UV light source is radiated to the plurality of lenses, so that the UV light source stops radiating the ultraviolet light after the anti-fog coating cured by the light-curable anti-fog material is formed.

4. The manufacturing method of anti-fog coatings on lenses according to claim 1, wherein the pre-drying step is performed under a temperature between 20° C. to 30° C., and a relative humidity between 40% to 60%.

5. The manufacturing method of anti-fog coatings on lenses according to claim 4, wherein the light-curable anti-fog material includes: 40 wt % to 50 wt % light-curable resins, 40 wt % to 50 wt % solvents, 3 wt % to 10 wt % photoinitiators, and 0.5 wt % to 1 wt % anti-fog particle materials.

6. The manufacturing method of anti-fog coatings on lenses according to claim 4, wherein the spraying station has the spraying device, the sucking station has the suction device, the setting area accommodates the plurality of lenses that have completed the lens spraying step and the cleaning step to perform the pre-drying step; the light curing station has the light curing apparatus for performing the curing step on the plurality of lenses; and wherein the plurality of lenses are sequentially moved to the spraying station, the sucking station the setting area, the light curing station and the discharging station to respectively perform the lens spraying step, the cleaning step, the pre-drying step, the curing step and the lens obtaining step in order.

7. The manufacturing method of anti-fog coatings on lenses according to claim 6, wherein the plurality of lenses are formed by molding through an injection molding machine, and the feeding station of the anti-fog coating manufacturing unit is connected with an output end of the injection molding machine, and the plurality of lenses formed by the injection molding machine are moved from the output end to the feeding station to perform the lens assembling step.

8. The manufacturing method of anti-fog coatings on lenses according to claim 7, wherein the feeding station, the spraying station, the setting area, the light curing station and the discharging station of the anti-fog coating manufacturing unit are connected with each other, and the feeding station, the spraying station, the setting area, the light curing station and the discharging station are arranged in a U shape or in a circle.

9. The manufacturing method of anti-fog coatings on lenses according to claim 1, wherein the light curing apparatus includes a chamber in which a closed accommodating space is formed and a plurality of UV light sources is disposed, an opening disposed at one side of the chamber, and a slidable plate, wherein the slidable plate is slidably disposed in the chamber and is able to slide in or out the accommodating space from the opening.

* * * * *